US 7,415,697 B1

(12) United States Patent
Houlding

(10) Patent No.: US 7,415,697 B1
(45) Date of Patent: Aug. 19, 2008

(54) METHOD AND SYSTEM FOR PROVIDING VISUALIZATION OF UNDERLYING ARCHITECTURE OF A SOFTWARE SYSTEM

(75) Inventor: David Ian Houlding, Tampa, FL (US)

(73) Assignee: Perot Systems Corporation, Plano, TX (US)

( * ) Notice: Subject to any disclaimer, the term of this patent is extended or adjusted under 35 U.S.C. 154(b) by 424 days.

(21) Appl. No.: 09/971,720

(22) Filed: Oct. 4, 2001

(51) Int. Cl.
G06F 9/44 (2006.01)

(52) U.S. Cl. ............... 717/104; 717/105; 709/224; 715/736; 715/751

(58) Field of Classification Search ............... 717/1–22, 717/125, 104, 105; 709/224; 715/736, 751
See application file for complete search history.

(56) References Cited

U.S. PATENT DOCUMENTS

| | | | | |
|---|---|---|---|---|
| 5,913,052 A | * | 6/1999 | Beatty et al. | 703/15 |
| 5,974,572 A | * | 10/1999 | Weinberg et al. | 714/47 |
| 6,144,962 A | * | 11/2000 | Weinberg et al. | 707/10 |
| 6,429,860 B1 | * | 8/2002 | Hughes | 345/418 |
| 6,550,054 B1 | * | 4/2003 | Stefaniak | 717/104 |
| 6,792,475 B1 | * | 9/2004 | Arcuri et al. | 709/245 |
| 7,031,968 B2 | * | 4/2006 | Kremer et al. | 707/100 |
| 2002/0108101 A1 | * | 8/2002 | Charisius et al. | 717/105 |
| 2002/0129329 A1 | * | 9/2002 | Nishioka et al. | 717/104 |
| 2003/0074648 A1 | * | 4/2003 | Brassard et al. | 717/104 |

* cited by examiner

Primary Examiner—Tuan Q. Dam
Assistant Examiner—Thuy Dao
(74) Attorney, Agent, or Firm—Winstead PC

(57) ABSTRACT

A method and system for providing a visualization of an underlying architecture of a software system. The method includes accessing a datafile descriptive of the underlying architecture. The datafile may be transformed to determine architectural components used to form the underlying architecture. Graphical elements representative of the architectural components of the underlying architecture may be rendered on a graphical display.

25 Claims, 8 Drawing Sheets

METHOD AND SYSTEM FOR PROVIDING VISUALIZATION OF UNDERLYING ARCHITECTURE OF A SOFTWARE SYSTEM

RELATED APPLICATION

This application relates to U.S. patent application Ser. No. 09/971,717 co-filed on Oct. 4, 2001.

BACKGROUND

1. Field of the Invention

The present invention relates generally to software systems, and, more particularly, but not by way of limitation, to graphical representations of a static and dynamic simulation for underlying architectures of graphical user interfaces for websites.

2. Background of the Invention

Software systems or applications, such as websites, include two aspects, one that is visible and one that is invisible. Visible aspects of a website includes a graphical user interface (GUI) and provides for an operator of the website to present information and/or services to users of the website. The invisible aspects of the website include an infrastructure for operating the website. The architecture of the website includes the components, such as a web server and a database, for enabling the graphical user interface to be functional for a user and operate on a system and/or network.

While the graphical user interface of the website is an important aspect of the website and provides the developer with a sense of accomplishment, the underlying architecture of the website is often the more difficult and time consuming part of the development to procure. In addition to the underlying architecture being more difficult to procure, developers of the website often find it challenging to adequately convey the technical aspects that are required in developing the underlying architecture to non-technical people, such as managers and customers.

One reason that software system developers have difficulty in adequately conveying underlying architecture development to non-technical people is that the website may be viewed as having two modes of operations, a static and a dynamic mode. The static mode of the website may include the content provided on the website, such as text, graphics, and data, and the dynamic mode may include operations that may be performed on the website, such as purchasing, computing, and searching. Each of these modes is very important to the full operation of the website from both a visual and functional aspect. However, in order to understand and appreciate the full operation of the website during concept, prototype, and deployment, both modes of the underlying architecture must be understood. Another reason for having difficulties in conveying the underlying architecture of the website to non-technical people may be due to having a complex underlying architecture that has different modes and utilizes different components (e.g., software and hardware) based on user website operating conditions.

To better understand the difference between website statics and dynamics, an analogy of a building may be considered. The building facade and floor plans may be considered part of the statics of the building, and the transient states, such as elevators, escalators, and temperature control systems may be considered part of the dynamics of the building. Applying the building analogy to a website, a model of the underlying architecture relates to blueprints of a building.

To reduce development time for website development, various software modeling languages have been developed. Such languages include the unified modeling language (UML), OMT, BOOCH, Rumbaugh, and Jacobson, for example. The unified modeling language, is generally considered to be a blueprint language by the software community.

While it is possible for the unified modeling language to provide a full understanding of the dynamics of the website, the actual code of the unified modeling language is often difficult to understand and provides little meaning to non-technical people. Additionally, there is no single standard architectural language throughout the software industry. Even though one website developer may understand one modeling language, such as the unified modeling language, other website developers may be accustomed to utilizing a different language for website development and modeling.

In general, development projects utilize graphical modeling tools to assist in the prototyping, modeling, testing, and monitoring phases of a development project. However, those developing websites may produce a graphical model or representation of the underlying architecture for the particular website being developed, but the graphical model oftentimes may be nothing more than a blueprint or static representation of the website. Furthermore, because the graphical representation is unique to the particular website being developed, the graphical representation is generally unusable for future development projects.

Another important issue arises in the security aspects of preventing an unauthorized user from gaining access to an intranet server when a user of the intranet server utilizes a browser on the Internet. As firewalls are universally utilized to prevent unwelcome and untrusted access to a secure intranet server, hosting an interactive software application on a host computer operating on the Internet for general access is problematic due to the interactive software application making requests of resources or relaying events to a client computer from the host computer. In other words, a client firewall classifies a response from the host computer as an untrusted request and blocks the response from penetrating the client firewall to get inside the client intranet.

One technique commonly utilized to avoid blocking desired requests from interactive software applications being hosted on a server computer is to configure the client firewall to allow the requests from the host computer to be accepted. This technique, however, becomes problematic and impractical as the interactive software application may be accessed by many client computers, and configuring each client firewall is time consuming and undesirable. Additionally, routing events from the client computer to the host computer and back to the client computer is undesirable from a performance standpoint.

SUMMARY OF THE INVENTION

To overcome the security issues of operating an interactive software application on a host server in communication with a client server across the Internet, the interactive software application may be downloaded to the client server and operated thereon. An exemplary interactive software application may be an applet operating within a web browser that is providing a graphical user interface. By operating the interactive software application on the client server, the security issues may be substantially reduced and operational performance may be enhanced. Additionally, a digital signature may be utilized by an applet operating in a web browser in communication with the interactive software application to further improve security.

One embodiment according to the principles of the present invention includes a method and system for providing security to a client computing system in communication with a host computing system across a network. The method includes executing a browser on the client computing system. A request to download data to be displayed in the browser may be communicated from the client to the host computing system. The data is downloaded from the host computing system to the client computing system via a client side firewall in response to the download request. An interactive software application is loaded in the browser, where the interactive software application utilizes the data downloaded from the host computing system. the interactive software application is executed in the browser on the client computing system, and may be in communication with at least one element, such as a browser or an element of an underlying architecture of a software application, on the client side of the client side firewall.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
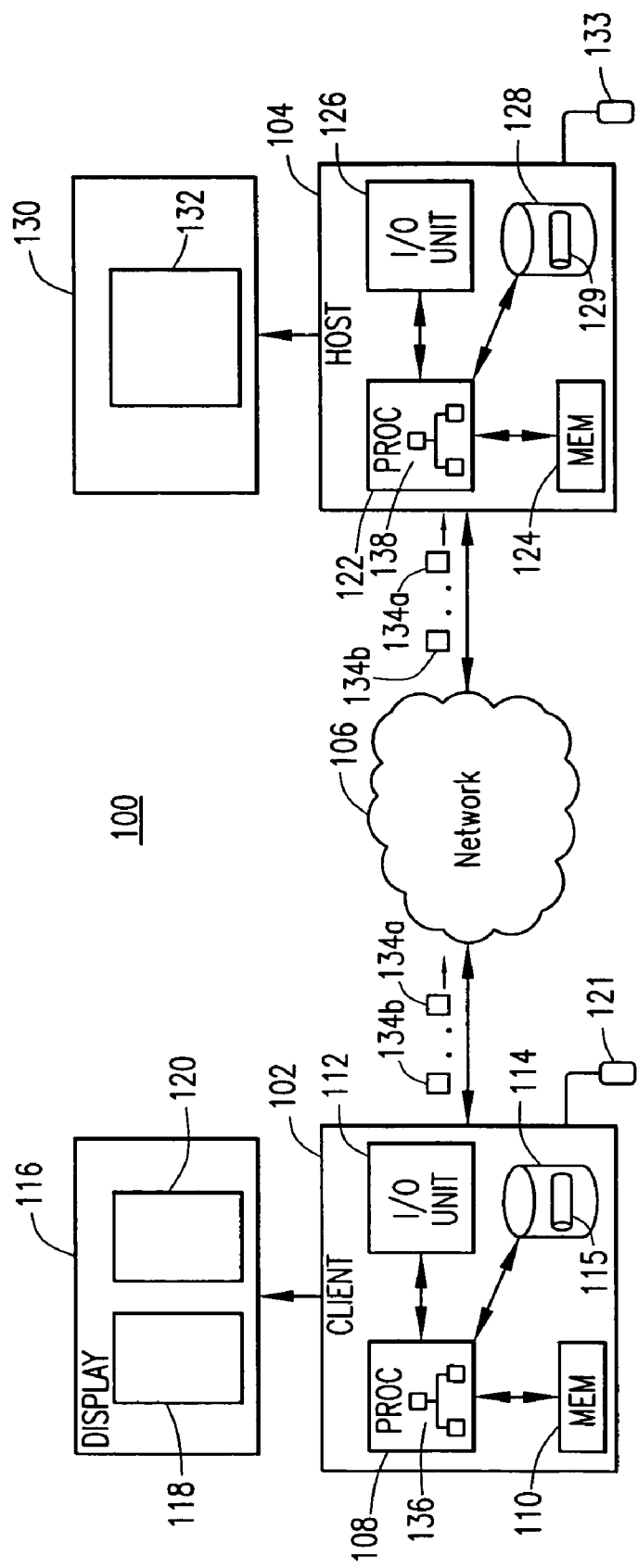
FIG. 1 is an exemplary system block diagram for operating the principles of the present invention.

The principles of the present invention will now be described more fully hereinafter with reference to the accompanying drawings, in which embodiments of the principles of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Software systems, such as websites (e.g., Internet applications such as Amazon.com), Intranet applications, or legacy system applications, generally include two aspects, a visible and an invisible aspect. The visible aspect is the "front end" of the software system and, typically includes a graphical user interface having content and pages of a website, for example. The invisible aspect includes an underlying architecture that provides for functionality and operability of the software system and system components, including hardware, operating in conjunction with the software system.

Developers of the software systems may graphically display the underlying architecture of the software system utilizing a visualizer according to the principles of the present invention. The visualizer provides for static and dynamic visualizations of the underlying architecture, where the static visualization may include structure of the architecture, and the dynamic visualization may include functional operations performed during an occurrence of an event, such as a login or purchase request. By providing both static and dynamic visualizations, the developer of the software system may provide non- or less-technical people, such as managers and clients, with a visual understanding and appreciation of the underlying architecture and collaboration thereof.

In one embodiment, the visualizer may be an interactive software application that operates within a browser on a client computing system. A user may utilize a software system operated by a host computing system of an application service provider (ASP) operating on a network, such as the Internet. The user may generate a datafile containing a description of the underlying architecture for the website utilizing a markup language, such as the extensible markup language (XML). The datafile may be generated utilizing an XML editor or a "wizard." The datafile containing the description of the underlying architecture may be uploaded to the server. A document type definition (DTD), which specifies a valid XML format for describing a visualization for the underlying architecture, may be utilized on the server to provide feedback to the user regarding the validity of the datafile. The user may update and store the datafile located on the server computing system so that the datafile may be globally accessed from any client server connected to the Internet.

To visualize the architecture, the datafile may be transformed on the server computing system and utilized by the visualizer. The resulting information from the transformation of the datafile that describes the architecture of the software system may be rendered to a visual display, such as a web page, using scalable vector graphics (SVG) to display the underlying architecture for example. The visualizer executing within the browser may be interconnected or communicating with another browser operating on the client computing system or the actual underlying architecture such that events may be communicated on the client side of a client firewall. Controls on the visual display may be selected to provide for dynamic visualization of the underlying architecture by issuing events, for example. The dynamic visualization provides the operator with the ability to graphically view collaboration of the architectural components that provides for operability of the underlying architecture of the software system, such as an Internet application.

The visualizer has three modes of operation based on the phase of development of the software system: (1) a direct interaction simulation, (2) a prototype simulation, and (3) an underlying architecture driven monitor. The direct interaction simulation may be operated without having security issues involved as the simulation executes within the confines of a web browser. The prototype and underlying architecture driven monitor has security issues due to events being communicated between the web browser operating the visualizer and interactive prototype or software application. The visualizer may be utilized as a development tool during conception, development, and deployment phases of the software systems.

In the conception phase, the user may define static and dynamic visualizations of the conceptual underlying architecture in the datafile and perform simulation analyses by utilizing controls provided by the visualizer. During the development phase, the static and dynamic visualizations of the underlying architecture may be refined based on functionality desired for the software system. Rather than utilizing controls to operate the visualizer, a corresponding website may be integrated with the visualizer using "hooks" as understood in the art to drive or interface with the visualizer. Finally, during the deployment phase, the user may replace simulated architectural components with actual architectural components, thereby utilizing the visualizer as a debugging and monitoring tool of the underlying architecture of the software system in operation. By utilizing the visualizer throughout development of the software system, time, money, and effort may be saved.

Security issues exist for computing systems that are communicating across the Internet. An application service provider hosting visualizers on a host computer may accommodate security concerns of clients by providing the ability for a client computer to download an interactive software application from the host computer via a client firewall. Once the interactive software application is on the client side of the client firewall, the interactive software application may be executed, and communication between the interactive software application and a browser displaying a visualization need not pass through the client firewall. To facilitate this communication securely, a digital code signing certificate may be used to digitally sign the executable content of the visualizer. Upon downloading the visualizer, the client web browser verifies that the digital signature of the executable content of the visualizer is from a trusted source and has not been altered enroute. Once the web browser has verified the authenticity of the digitally signed content, it then proceeds to execute the content with sufficient privileges to allow the visualizer to open a port of the browser on the client computing system for communication of data between the interactive software application and the browser. The data may include events and requests utilizing the hypertext transport protocol HTTP or other protocol as understood in the art.

FIG. 1 is an exemplary system block diagram 100 for operating the visualizer according to the principles of the present invention. The system includes a client computing system 102 and a host computing system 104. The client computing system 102 and the host computing system 104 are in communication via a network 106, such as the Internet.

The client computing system 102 includes a processor 108 coupled to a memory 1110 and an input/output (I/O) unit 112. The I/O unit 112 is further coupled to a storage unit 114 including a database 115 stored thereon. The client computing system is coupled to a display unit 116. An application graphical user interface (GUI) 118 and a visualization GUI 120 may be displayed on the display unit 116. A control device 121, such as a computer mouse, keyboard, etc., may be utilized to operate the graphical user interfaces 118 and 120.

The host computing system 104 includes a processor 122 coupled to a memory 124 and an I/O unit 126. The I/O unit 126 may be coupled to a storage unit 128 including a database 129 stored thereon. A display 130 may be coupled to the host computing system 104, and utilized to display a graphical user interface (GUI) 132. A control device 133 may be utilized to operate the GUI 132.

In operation, the client computing system 102 may communicate with the host computing system 104 via data packets 134a and 134b. The data packets 134a and 134b communicate information between the client computing system 102 and the host computing system 104 via the network 106 for operating the visualization GUI 120 according to the principles of the present invention. The processor 108 of the client computing system 102 operates at least one software program 136 for operating the application 118 and visualization 120 GUIs. The processor 122 of the host computing system 104 operates a software program 138 for operating the database 129 in conjunction with the software program 136 for operating the visualization GUI 120.

In generating the visualization GUI 120, a user operating the client computing system 102 may generate and upload a datafile to be stored in the client database 115. The datafile may include extensible markup language (XML) or other markup language that describes the underlying architecture of the software system. Upon completing the datafile describing the underlying architecture, the datafile may be communicated across the network 106 to the host computing system 104 and stored in the host database 129. Once the datafile is stored in the host database 129, the user of the client computing system 102 may utilize the datafile from the client computing system 102 or any other computing system operating on the network 106, which provides access location flexibility to perform presentations for different audiences utilizing the visualization GUI 120.

Figure 2:
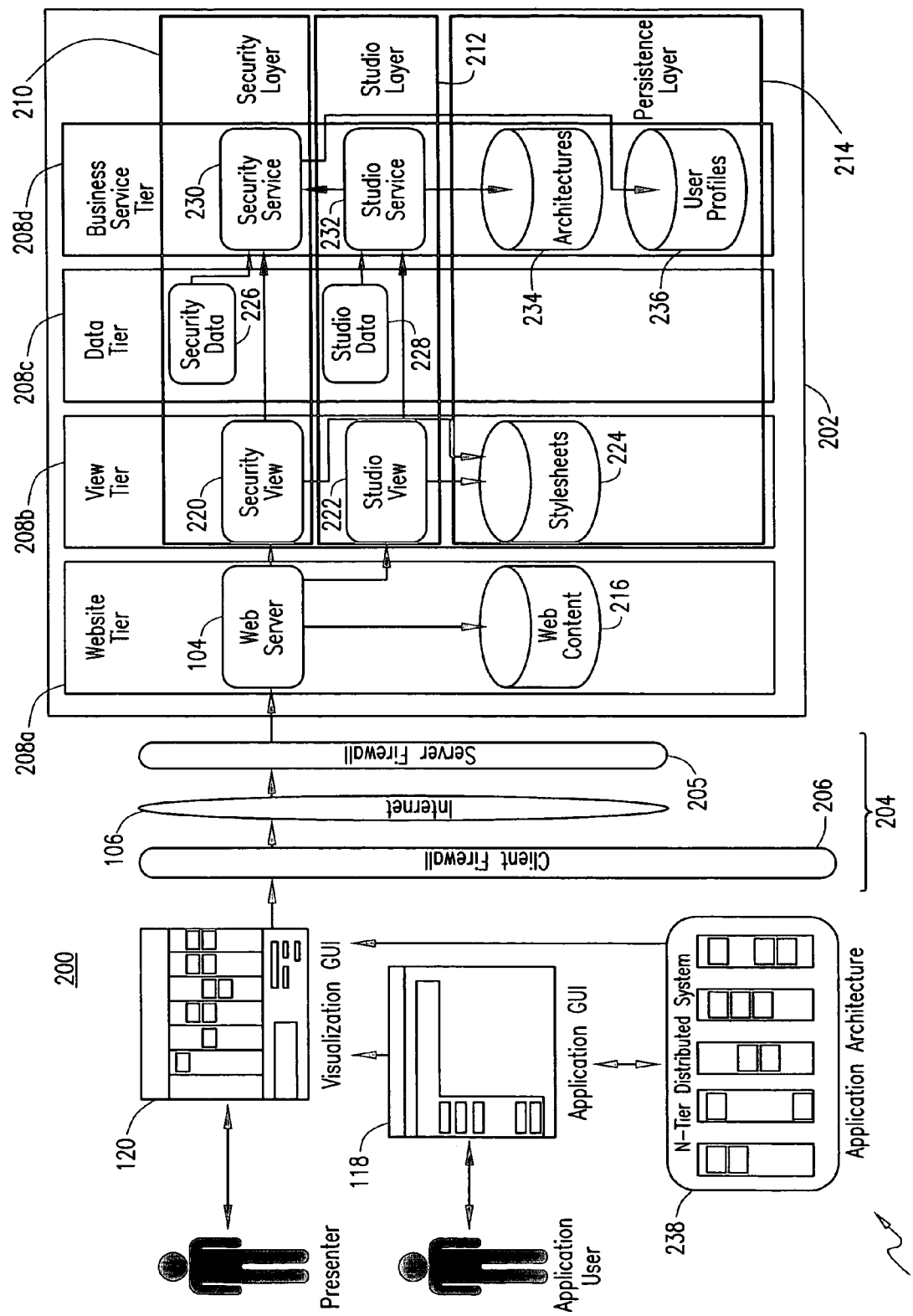
FIG. 2 is an exemplary graphical representation of a front-end and back-end of a visualizer as operated by the system of FIG. 1.

FIG. 2 is an exemplary block diagram 200 of a configuration for operating the visualization GUI 120 on the system 100 according to the principles of the present invention. Server-side components 202 are configured to service client-side components 203 utilizing network components 204. The server-side components 202 are configured to provide access by a client via a network 106, such as the Internet, and provide security and functionality for the client-side components 203. In operation, a datafile describing the underlying architecture of a software system may be prepared on the client computing system 102 and uploaded to the server-side components.

The network components include a server firewall 205 coupled between the network 106 and the server-side components 202. A client firewall 206 is coupled between the network 106 and the client-side components 203.

The server-side components 202 are configured in tiers or layers. The tiers include a website tier 208a, view tier 208b, data tier 208c, and business services tier 208d. The layers include a security layer 210, studio layer 212, and persistence layer 214. The website tier 208a serves as a gateway on the Internet for clients to access the uploaded datafiles, such as architecture visualizations, that are provided to the client 102 by the server-side components 202. The website tier 208a includes the host computing system 104 and a web content database 216.

The view tier 208b serves to operate client requests and prepare data using the uploaded datafiles to be displayed on the visualization GUI 120. The view tier 208b includes a security view 220, studio view 222, and stylesheet database 224. The data tier 208c includes data to be utilized in providing services for operating the visualization GUI 120. the data tier 208c includes a security data component 226 and a studio data component 228. the business services tier 208d is utilized to drive the visualization architecture displayed in the visualization GUI 120, and includes a security services component 230, studio service component 232, architecture database 234, and user profile database 236.

The security layer 210 operates as an infrastructure service that implements application layer security. The security layer 210 leverages a simple design pattern appropriate for extensible markup language (XML) and extensible stylesheet language (XSL) based architectures. The design pattern includes a security view component 220, data component 226, and security service component 230, where the view component provides access to transform the content in the datafile, the data component provides access to raw XML content, and the service component contains business logic used by both the view and data components. The design pattern may be replicated across all infrastructure and business services provided by the architecture, and may also be used for the architecture visualization business service in the studio layer 212.

In particular, the security view component 220 is responsible for (i) accepting client requests, (ii) delegating the client requests to the security service component 230 for processing, (iii) retrieving an XSL stylesheet from the stylesheet repository 224, and (iv) using the stylesheet to transform the XML results from the security service component 230 into a format, such as HTML, appropriate for the client. The security view component 220 enables different types of presentations to be supported for visualization by simply adding XSL stylesheets, which, in general, does not require code changes to the server side infrastructure. the security view component 220 further provides architectural flexibility and enables a clean separation of presentation (i.e., visual display) from content (i.e., information). Having a clean separation of presentation from content also facilitates a clean separation of development and maintenance responsibilities since project team members responsible for presentation may work on stylesheets independently of the underlying infrastructure that deliver these services via an XML interface. The security view component 220 may be implemented as a Java servlet, but may be alternatively implemented in a variety of other forms, such as a Java server page (JSP).

The security data component 226 is responsible for accepting client requests, delegating the requests to the security service component 230 for processing, and returning the XML results directly to the client without transformation. The reasons for the security data component 226 in the XML/XSL architectural pattern may be understood on both a development and deployment level. During development, XSL stylesheets may be created that power the studio view component 222. Enabling developers to access the XML content through the data component facilitates the creation of these XSL stylesheets by providing the input to the transformations defined by the XSL stylesheets. Having access to the XML is also useful during testing and troubleshooting of the software system. On the other hand, during deployment of the software system, the security data component 226 may be used as a channel for software systems for clients and external servers to access services without "screen scraping." A client having a "thick" Java application may log on using the security data component 226 and access XML visualization information directly for transformation and rendering of the underlying architecture on the client side. The security data component 226 may be implemented as a Java servlet, but may alternatively be implemented in other forms, such as a Java server page.

The security service component 230 is an infrastructure service component that implements the logic to drive the security layer 210. The security service component 230 may be implemented using Java and a variety of middleware solutions, such as EJB and standard RMI or CORBA. Note that the security service component 230 in the XML/XSL design pattern uses a Java/XML binding at its core. The binding includes a set of Java classes that are automatically generated using a tool that is run on the DTD or Schema used to validate the architecture visualization XML during development of the underlying architecture of the software system. Using such a Java/XML binding aids in rapid development of the underlying architecture, makes code more legible, and reduces complexity of a generic XML application program interface (API). As shown, the DXML Java/XML binding from ObjectSpace™ may be utilized. Alternatively, JABX Java/XML binding from Sun Microsystems, Inc. may be utilized.

The studio layer 212 operates as a business service that implements architecture visualization functionality. The studio layer 212 relies on the security layer 210 for application security and leverages the same XML/XSL design pattern. Collaborations, responsibilities, and implementations are the same for the components in the studio layer 212 as the counterparts in the security layer 210.

The studio view component 222 is responsible for (i) accepting client requests for visualizations, (ii) delegating the requests to the studio service component 232, (iii) retrieving an XSL stylesheet from the stylesheet database 224, and (iv) using the stylesheet to transform the XML results from the studio service component 232 into a presentation format appropriate for the client, which may utilize HTML, SVG, Shockwave, and Flash, for example. As understood in the art, an XSL stylesheet defines a transformation that generates a presentation, such as a bar chart or line chart, from the XML content being presented. By using different XSL stylesheets, the studio view component 222 enables architecture visualizations to be presented in a variety of different formats and, potentially, using a variety of different presentation languages.

The studio data component 228 is responsible for (i) accepting client requests for visualization XML content, (ii) delegating these requests to the studio service component 232, and (iii) returning the XML results directly to the client without transformation. The studio service component 232 is a business service component that implements the logic required to drive the visualization of the underlying architecture. The studio service component 232 accepts requests from either the studio view component 222 or the studio data component 228, and retrieves XML architecture visualization definitions from the architecture database 234. The studio service component 232 processes the architecture visualization definitions, if necessary, and delivers the results in the form of an object model built using classes from the Java/XML binding.

The persistence layer 214 contains repositories or databases that provide content that drives the visualization infrastructure. The stylesheet database 224 is a repository of XSL stylesheets used by the components in the view tier 208*b* of the architecture to transform XML results into presentation formats, such as HTML and SVG, as appropriate for the client. In the architecture database 234, architecture visualization definitions in the form of XML documents are stored. A user profile database 236 is a repository of user profiles that contain information used by the security service component 230 to authenticate users and control access by those users according to predetermined privileges as specified in the users profile.

The client-side components 203 comprise the visualization GUI 120, application GUI 118, and application architecture 238. The visualization GUI 120 is a visualizer that may operate within a web browser and is utilized to display a visualization (i.e., graphical representation of components utilized to form the underlying architecture of the software system). The application GUI 118 may be a web page operating as a "front end" of the software system that utilizes the underlying architecture that provides "back end" operability of the software system or application GUI 118. As shown, the user interface is operating within a web browser. Alternatively, the application GUI 118 may be operating within a Java application.

The application architecture 238 is the underlying architecture that provides the back end of the software system operating on the client side utilized to drive the visualization GUI 120. It should be understood that the visualization GUI 120 may communicate with the application GUI 118 or application architecture 238 in a real-time or non-real-time monitoring mode during development and deployment. The application architecture 238 may be enabled to send events to the visualization GUI 120 in the form of HTTP requests, for example. By monitoring the underlying architecture via the visualization GUI 120, the developer of the software system may monitor and debug system operation and enhance system performance.

Early in a software system project development, such as during prototyping of the application GUI 118 and before the underlying architecture of the software system is implemented, the application GUI 118 may be coupled directly to the visualization GUI 120. By coupling the GUI 118 and 120, a demonstration of the application GUI 118 being prototyped and the visualization GUI 120 displaying the underlying architecture serves to simulate how the underlying architecture behaves in response to input from the application GUI 118. To form the simulation when the underlying architecture is either partially or completely constructed, the application GUI 118 may drive the underlying architecture, which, in turn, drives the visualization GUI 120. This enables the same visualization that was used earlier for prototype simulation to operate in a development simulation and monitoring system. By utilizing an architectural approach, the same visualization may be utilized throughout the software system development project cycle—from simulation during prototyping through monitoring during development and deployment.

The network components 204 include the client firewall 206, the network 106, and the server firewall 205. The network components 204 provide for communication between the client-side components 203 and the server-side components 202.

The client firewall 206 may be an Internet firewall that protects the client-side components 203 from attacks originating from the network 106. The client firewall 206 restricts communications and substantially blocks requests originating from outside the client infrastructure on the network 106. By blocking requests originating outside the client-side components 203, the visualization GUI 120 may be prevented from receiving events that originate outside the client firewall 206.

Pragmatically, business users may access visualizations from a number of different locations on the network 106 that are protected by separate client firewalls 206. It is impractical to configure each of the client firewalls for using the server-side components 202. This constraint has led to an approach that enables the application architecture 238 on the client side to be visualized in the visualization GUI 120 in a web browser. The visualization GUI 120 operation is also executed inside the client side of the client firewall 206. Since both the visualization GUI 120 and the entity communicating with it are inside the client firewall 206, there is no need for events to penetrate the client firewall 206 from the network 106, and, therefore, the associated security issues are effectively circumnavigated. Additionally, performance of the visualization is improved as the visualization GUI 120, the application GUI 118, and the application architecture 238 operate on the client side so that communication over the Internet is avoided, thereby reducing the associated network latency delays.

The network 106, which may be the Internet, may be public and untrusted. As the network 106 may be public, visualizations (e.g., XML datafiles describing the underlying architecture) may be stored at a central location, such as within the host computing system 104, to be accessed over a network and/or globally at a low cost. However, since the Internet is public and untrusted, security is required to ensure authentication, authorization, privacy, and data integrity. The security may be implemented in two layers, namely communication and application layer security.

Communication layer security is realized in the form of secure HTTP (HTTPS) over the Internet to ensure server authentication, privacy, and data integrity. Application layer security, on the other hand, is realized in the form of a login at the host computing system 104 for (i) user authentication, (ii) assignment of a secure session ID upon successful authentication, and (iii) subsequent access control based on a combination of an assigned secure session ID and access privileges of the authenticated user as indicated by the profile for that user stored in the user profile database 236 on the server side.

The server firewall 205 is a network firewall that serves to protect the server-side components 202 from attacks originating on the open network. The server firewall 205 may be generic or customized as understood in the art.

Figure 3:
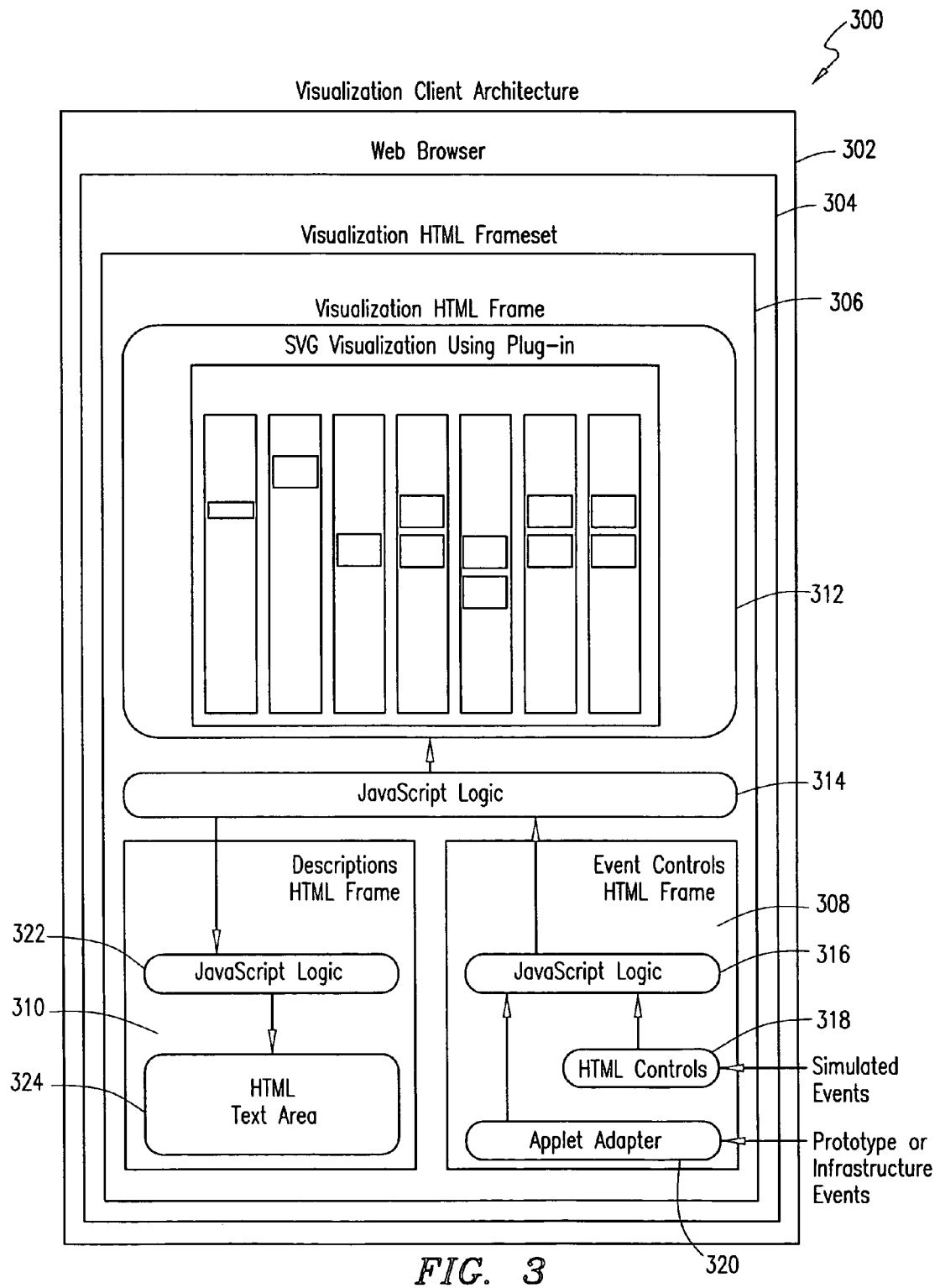
FIG. 3 is an exemplary architecture for a client as operated by the system of FIG. 1.

FIG. 3 is an exemplary client-side architecture 300 operating on the client computing system 102 for operating the visualizer or visualization according to the principles of the present invention. As shown, the client-side architecture 300 includes a web browser 302 that operates a visualization HTML frame set 304. The HTML frame set 304 contains three frames that form the visualization client, including (i) a visualization HTML frame 306, (ii) an event controls HTML frame 308, and (iii) a descriptions HTML frame 310. The visualization HTML frame 306 contains a visualizer 312 and JavaScript logic 314.

The visualizer 312 is driven by a scalable vector graphic (SVG) embedded object (not shown) in the web page operating the visualizer 312. The SVG object may be a plug-in or a Java applet, and may render content of the visualizer 312 in the form of an SVG document. The SVG object represents the SVG document for the architecture visualization as a document object model (DOM) that is accessible to the visualization JavaScript logic 314, and may be used by the JavaScript logic 314 to make changes to the visualization. For example, the JavaScript logic 314 may highlight and unhighlight components or elements presented on the visualizer 312. Additionally, a user may select an element displayed on the visualizer 312 during a static exploration of the underlying architecture being displayed on the visualizer 312, which results in the JavaScript logic 314 highlighting or unhighlighting the selected element. The visualization JavaScript logic 314 may include JavaScript functions that implement the behavior required for static and dynamic exploration of the underlying architecture displayed in the visualizer 312.

The event controls HTML frame 308 is an HTML frame that loads web pages containing event controls used to drive the behavior of the visualizer 312. The event controls HTML frame 308 includes event JavaScript logic 316, event HTML controls 318, and an event applet adapter 320. The event HTML controls 318 may include soft buttons, menus, and/or selection lists that enable the user of the visualizer 312 to control visualization parameters, such as the speed of operation of the visualization. The event HTML controls 318 may also be used to manually initiate events during a simulation of the underlying architecture operating in the visualizer 312 so that the user may visually observe collaboration of elements of the underlying architecture displayed in the visualizer 312 operating to perform the desired functions of the software system. It should be understood that the event HTML controls 318 may be utilized during development of the software system to simulate events occurring in the underlying architecture, however, the HTML controls 318 may be utilized during prototyping, development, and deployment of the software system for additional control of the visualizer 312.

The event applet adapter 320 provides a remote interface through which the visualizer 312 may receive events. The event applet adapter 320 may be digitally signed so that the applet may execute outside the Java "security sandbox" and has the necessary privileges to expose a server interface. As understood in the art, a digital code signing certificate may be obtained from a company named Verisign and stored on the storage unit 114 of the client computing system 102. The certificate may be used during development of the event applet adapter to digitally sign in to prepare for its deployment.

Upon receiving the digitally signed event applet adapter and verifying the associated digital signature, the event applet adapter may be executed by the web browser. A port for the web browser 302 on the client computing system 102 operating behind the client firewall 206 may then be opened to allow requests or events to be received from the application architecture 238 or application GUI 118).

By utilizing a digital signature to allow the visualizer to operate with an application executing on the client side, security of the client computer is maintained. The type of interface exposed in the instant example is an HTTP server interface that enables events to be sent to the visualizer 312 either from a prototype application GUI 118 or from the application architecture 238 during monitoring by using a simple "HTTP GET" request. Alternatively, other protocols, such as CORBA, may be utilized as an interface. Arguments or parameters that define the event being sent may be encoded in a simple common gateway interface (CGI) name/value pairs that are appended to the "HTTP GET" request. These parameters are interpreted by the event applet adapter 320 and a JavaScript callback is delegated to the event JavaScript logic 316 to realize the associated visualization behavior.

As configured in FIG. 3, the same event JavaScript logic 316 may be utilized to drive simulations for both the simulation and monitoring modes of the visualizer 312. Note that other types of middleware interfaces may also be exposed by the event applet adapter 320 including, for example, RMI or CORBA to integrate with an application architecture 238 that uses the event controls HTML frame 308. It should be understood that the client-side architecture may be utilized for interactive software applications other than the visualizer as discussed herein.

The descriptions HTML frame 310 is utilized to control and display a text area located on the visualization GUI 120. The descriptions JavaScript logic 322 controls the display of the text in the text box. The descriptions JavaScript logic 322 may be called by both the visualization and event JavaScript logic components 314 and 316, respectively, to display descriptions of operations of the underlying architecture. The descriptions HTML text area 324 displays actual textual descriptions that may be scrollable. The descriptions may include information to aid in a user's understanding as to the events and operations being performed by the underlying architecture as displayed on the visualizer 312.

Figure 4A:
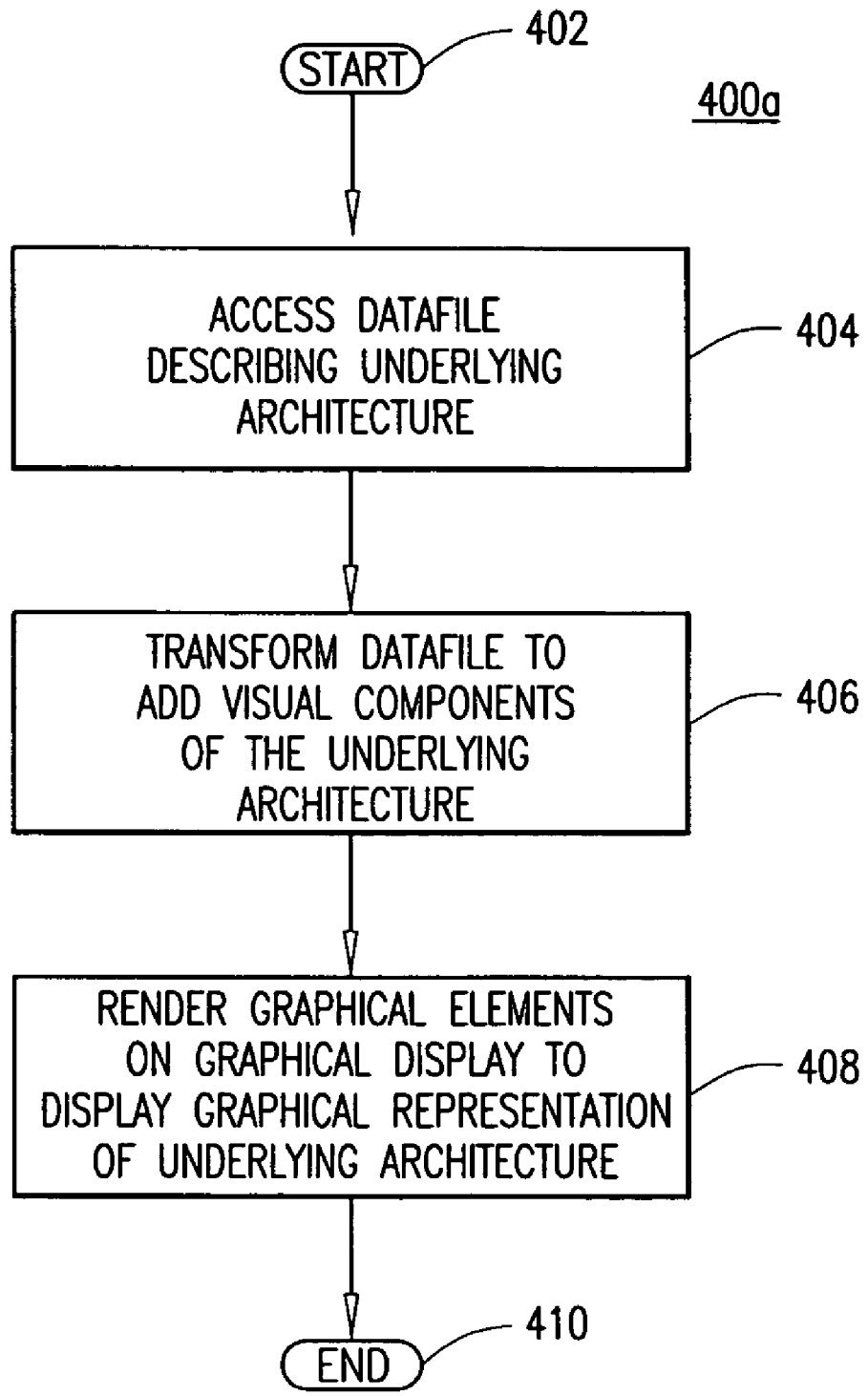
FIG. 4A is an exemplary flow diagram for operating the visualizer of FIG. 2.

FIG. 4A is an exemplary flow diagram 400a for operating the visualization GUI 120 according to the principles of the present invention. The process starts at step 402. At step 404, a datafile describing an underlying architecture of a software system is accessed. The datafile may include markup language data for describing the underlying architecture of the software system. At step 406, the datafile describing architectural components of the underlying architecture of the software system may be transformed. In one embodiment, the transformation may occur on the host computing system 104 via the server-side components 202. Alternatively, the transformation may be performed on the client side using the same or similar client-side components. In performing the transformation of the datafile, an XSL stylesheet stored in the stylesheet database 224 may be utilized to add visual information, such as a template, to the content described by the datafile. The transformed data may be communicated across the network 106 from the server computing system 104 operating as a host to the client computing system 102 and rendered directly to the visualization GUI 120 or stored in the storage unit 114 for later usage without having to access the server computing system 104 until the datafile is altered. At step 408, graphical elements indicative of the architectural components may be rendered on a graphical display, such as the visualization GUI 120, to display a graphical representation of the underlying architecture of the software system. At step 410, the process ends.

Figure 4B:
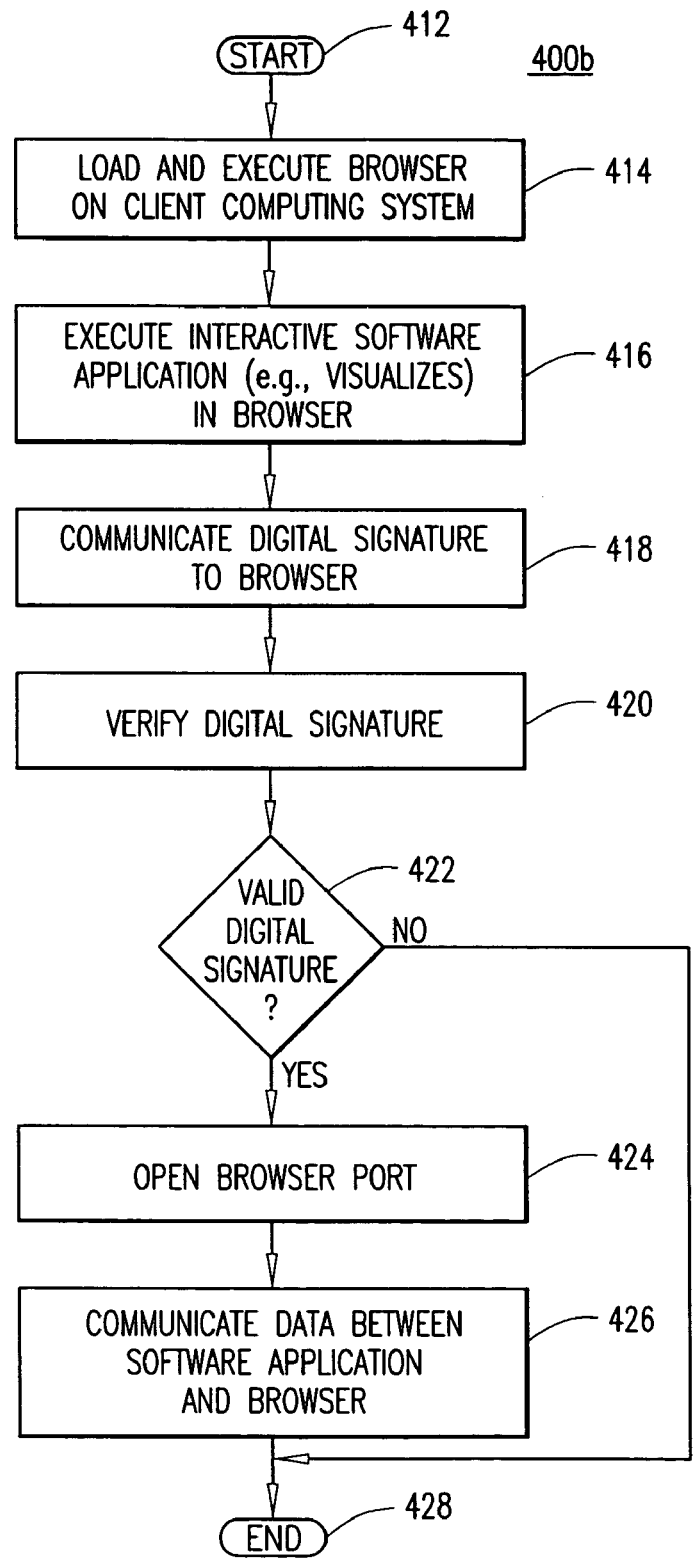
FIG. 4B is an exemplary flow diagram 400c for providing additional security for the client computing system 102.

FIG. 4B is an exemplary flow diagram 400b for providing additional security for the client computing system 102 operating an interactive software application, such as the visualizer 312 or any other software application that receives requests and communicates responses in the form of events or commands. The process starts at step 412. At step 414, the browser 302 is loaded and executed on the client computing system 102. The interactive software application is then executed by the browser 302 running on the client computing system 102. Because the interactive software application is executed in a browser 302 on the client computing system 102, the client firewall 206 does not interact with communications between the browser 302 and another browser, such as the application GUI 118, operating on the client computing system, for example. At step 418, a digital signature is communicated to the browser 302 and verified at step 420 for an applet operating within the browser 302. If the digital signature is found to be valid at step 422, a port of the browser 302 is opened for communication with another browser and/or underlying architecture operating on the client computing system 102; otherwise, the process ends at step 428. Data may then be communicated with the interactive browser 302 without security concerns. The process ends at step 428.

Figure 5:
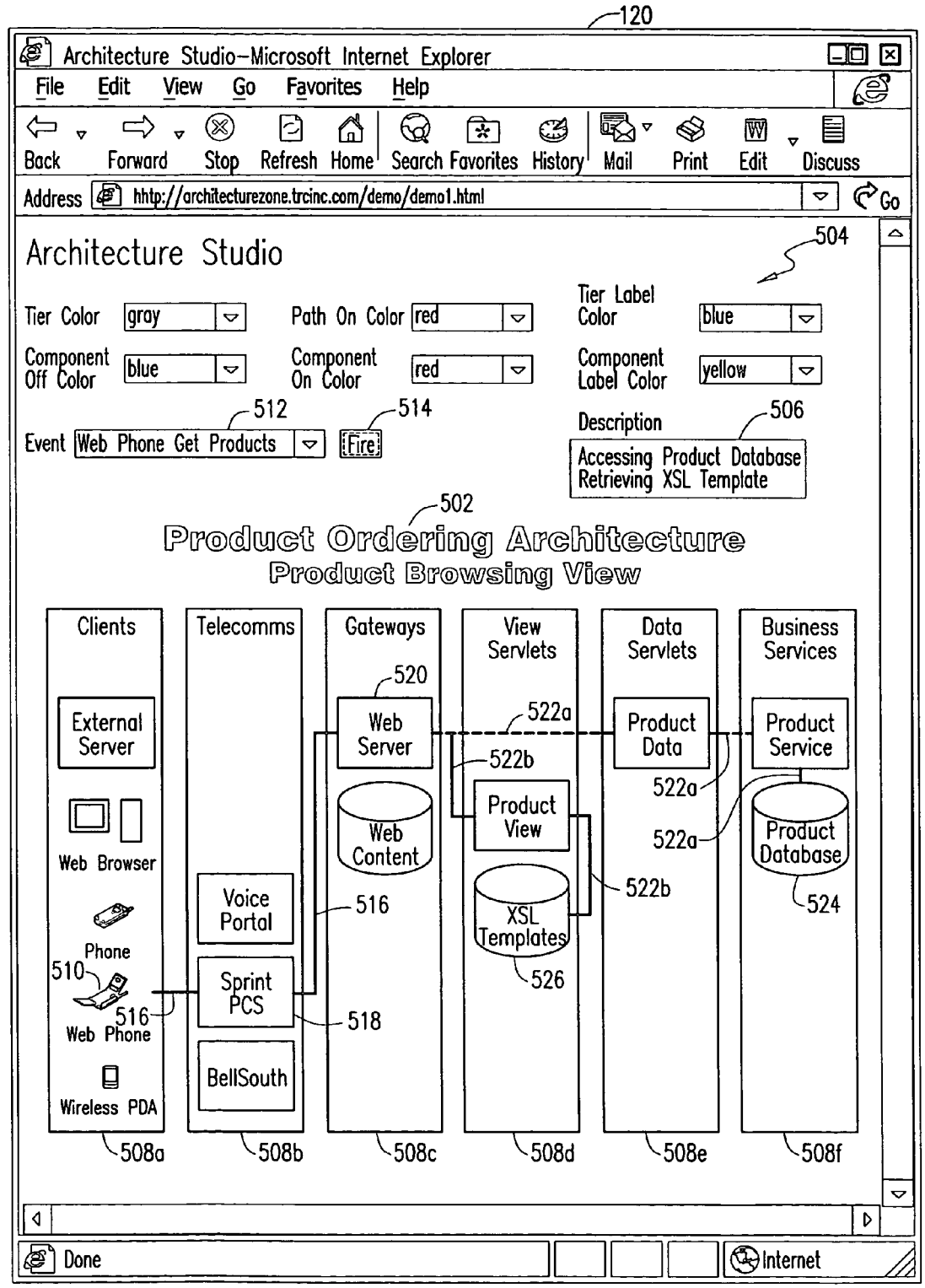
FIG. 5 is an exemplary web page including the visualizer of FIG. 2.

FIG. 5 is an exemplary visualization GUI 120. The visualization GUI 120 includes a visualization 502, HTML control elements 504, and an HTML text box 506. The visualization includes tiers 508a-508f Each of the tiers 508a-508f represents a different layer of the underlying architecture of the software system being represented. As shown, the visualization 502 is an exemplary "Product Ordering Architecture" providing a product browsing view of the software system, which may be utilized by an online toy store, book seller, or flower shop, for example. Within each of the tiers, exemplary elements of the underlying architecture are graphically displayed. For example, in the clients tier 508a, a variety of elements, such as a web phone graphical element, may be displayed.

To simulate collaboration between the elements of the underlying architecture, an event may be selected by an event pull-down control element 512. To initiate the event, a "fire" control element 514 may be selected by a user utilizing a control device, such as a computer mouse (not shown). In the instant example, the event pull-down control element 512 is selected to perform the event of "Web Phone Get Products." Upon selecting the "fire" control element 514, the visualization 512 simulates operation of the underlying architecture by highlighting the graphical elements that collaborate to operate the selected event. Additionally, a line may sequentially connect the graphical elements to indicate collaboration between the graphical elements between the tiers 508a-508f.

For the instant example, a line 516 may sequentially couple the web phone graphical element 510, the "Sprint PCS" graphical element 518 in the telecoms tier 508*b*, and the "web server" graphical element 520 in the gateways tier 508*c*. Two lines are shown extending from the "web server" graphical element 520, a dashed line 522*a*, and a solid line 522*b*. The dashed line 522*a* represents a first step for accessing a product database as indicated by the "product database" graphical element 524 via a product data component and a product service component of the underlying architecture for the software system. Upon completion of accessing the product database, the visualization 502 graphically represents the next step in the process for displaying the data from the product database on the application GUI 118, for example, by connecting a line 522*b* between the graphical elements that collaborate to perform the operation. In the instant example, a stylesheet is selected from the stylesheets templates database 224 so that the product data from the product database 524 may be displayed on a common template shown in the application GUI 118 as generally expected by a user of a website.

The HTML text box 506 is utilized to indicate the operations that are being performed in sequence to the user of the visualization 502. As shown, the first description or text indicates that the product database is accessed, and the second description indicates that the XSL template is retrieved. It should be understood that other data indicative of operations being performed by the underlying architecture for the software system may be listed in the HTML text box 506. It should be further understood that other types of information may be displayed in the visualization 502 and that the visualization 502 need not be displayed as tiers. For example, the visualization 502 may be displayed as hierarchical elements in a tree structure or other visually pleasing graphical structure.

Figure 6:
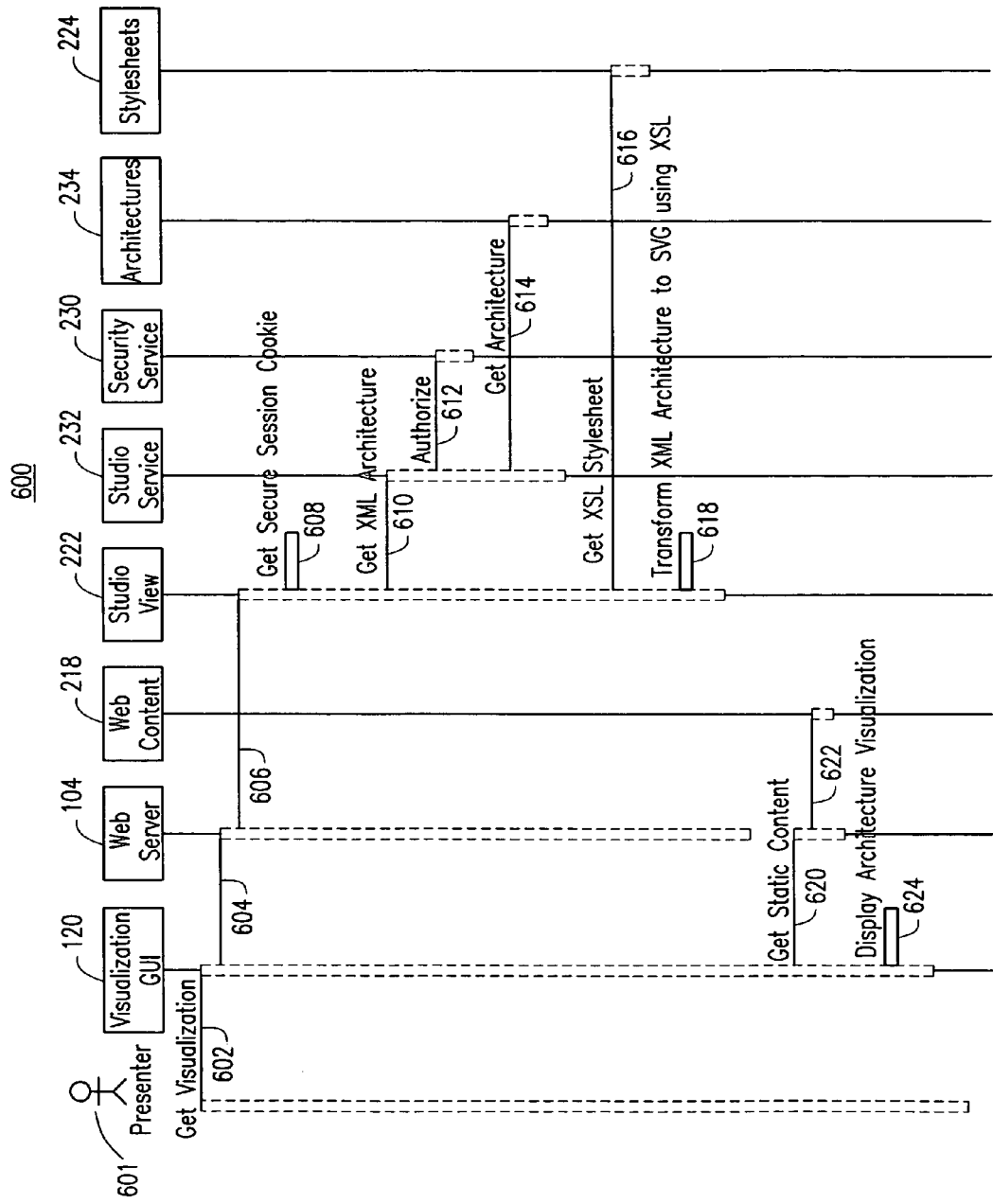
FIG. 6 is an exemplary interaction diagram including the components for operating the visualizer of FIG. 2.

FIG. 6 is an exemplary interaction diagram 600 between elements of the server-side components 202 to show how the server-side components 202 operate in conjunction for operating the visualization GUI 120. At step 602, a user or presenter demonstrating operation of the underlying architecture for the software system invokes the visualization process. To invoke the visualization process, the presenter 601 initiates a "Get Visualization" command by utilizing the web browser controls. At step 604, the visualization GUI 120 communicates to the web server 104 to access the visualization of the underlying architecture of the software system described by XML as stored in the architecture database 234, for example. The web server 104 thereafter contacts the studio view component 222 at step 606.

At step 608, the studio view components 222 retrieves a secure session cookie. The studio view component 222 communicates to the studio service component 232 to retrieve the XML architecture stored in the architecture database 234 for the visualization selected by the presenter 601 at step 610. At step 612, the security service component 230 is contacted by the studio service component 232 for authorization to access the XML architecture. Upon receiving authorization by the security service component 230, the studio service component 232 requests the XML architecture (i.e., XML code describing architecture to be visualized) from the architecture database 234 at step 614.

At step 616, the studio view component 222 gets an XSL stylesheet from the stylesheet database 224 to be utilized for the XML architecture to be displayed in the visualization GUI 120. At step 618, the XML architecture is transformed to scalable vector graphics using the XSL stylesheet. At step 620, the visualization GUI 120 retrieves static content (e.g., HTML control elements 504) from the web content component 218 via the web server 104. At step 624, the underlying architecture is displayed in the visualization GUI 120.

The interaction diagram 600 as shown is initiated by a presenter 601 for simulation of a software system that is being prototyped. However, as the software system is further developed, the presenter need not initiate or execute the simulation using HTML control elements 504, but rather may operate the application GUI 118 to have the events being triggered by selection of control elements located on the application GUI 118. Furthermore, upon further development of the application architecture for the software system, the application architecture may be integrated with the client-side architecture 300 (FIG. 3) to operate the visualization GUI 120. By utilizing the application GUI 118 and the application architecture 238, the developer of the software system may troubleshoot the underlying architecture efficiently. The visualization GUI 120 may additionally be utilized to display the underlying architecture of a software system for non-technical people, such as managers and customers, who are unable to understand the underlying architecture of the software system from XML or other software code. While the server-side components 202 perform the functions of generating the visualization of the application architecture by utilizing an XML architecture stored in an architecture database 234, it is contemplated that some or all of the components to generate and operate the visualization GUI 120 may be operated on the client side.

Figure 7:
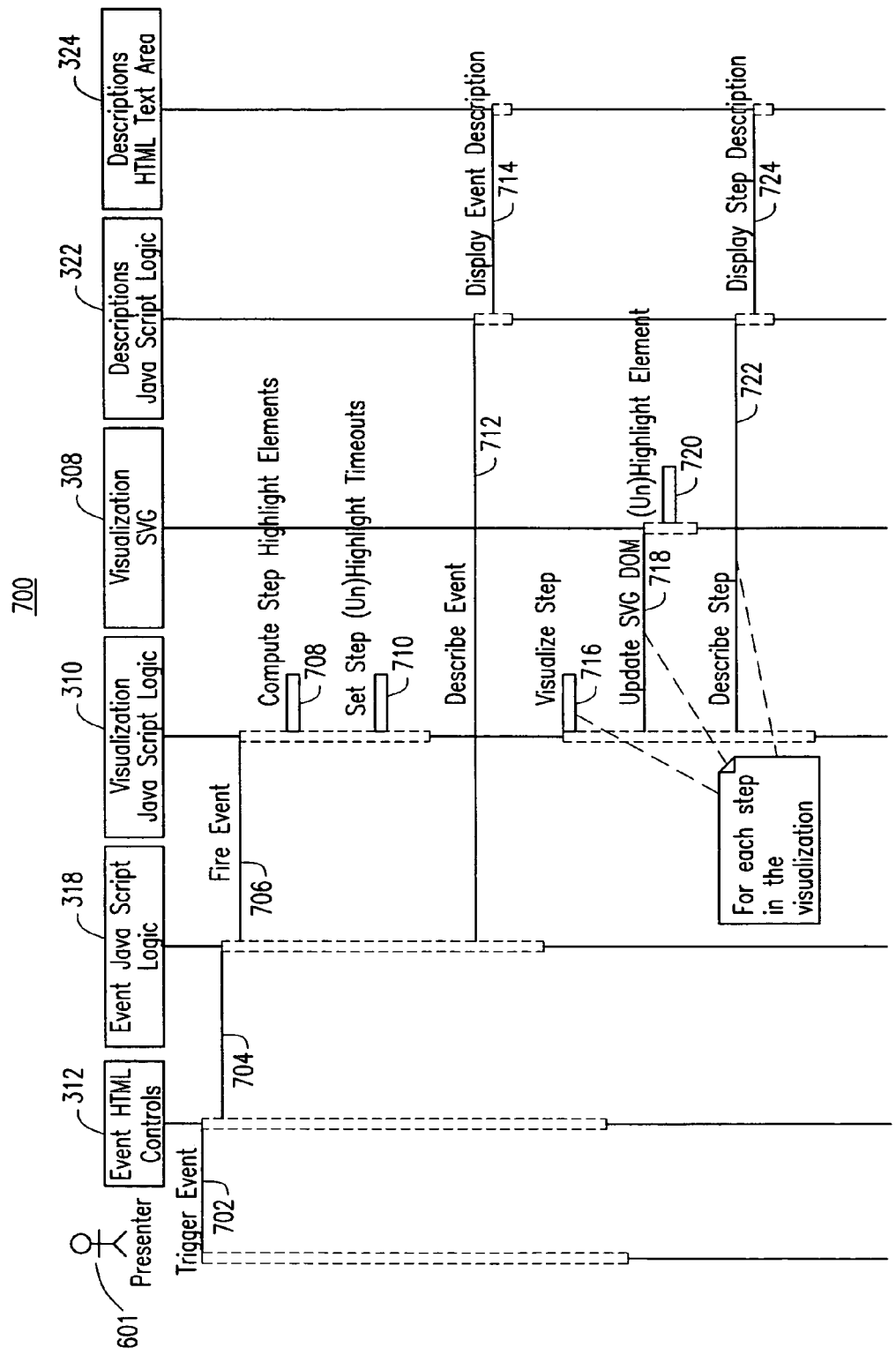
FIG. 7 is another exemplary interaction diagram including the components of the visualizer of FIG. 2.

FIG. 7 is an exemplary interaction diagram 700 for describing events generated on the visualization GUI 120 by the components of the client-side architecture 300. As indicated by the presenter 601, the presenter triggers an event at step 702, thereby indicating that the interaction as being shown is a simulation during the prototyping stage of the software system. The event is triggered by the presenter 601 selecting one of the event HTML controls 312. At step 704, the event HTML control interacts with the event JavaScript logic 318, which, in turn, fires an event at step 706 to the visualization JavaScript logic 310.

At step 708, the visualization JavaScript logic 310 determines the elements to highlight for operations performed by the underlying architecture. At step 710, the visualization JavaScript logic 310 sets highlight and unhighlight timeouts for each step. It should be understood that because the visualization JavaScript logic 310 predetermines the graphical steps to be performed for the selected events, that the graphical representation of the events for their corresponding elements of the underlying architecture of the software system may be synchronous or asynchronous as selected by the presenter 601 via an HTML control element 504.

At step 712, the event JavaScript logic 318 communicates with the descriptions JavaScript logic 322 to display an event description at step 714 on the HTML text area 324. Steps 716-724 may be executed for each of the steps in the visualization. At step 716, the visualization JavaScript logic 310 performs a visualization step. The visualization JavaScript logic 310 updates the scalable vector graphics document object model (SVG DOM) by utilizing the visualization SVG 308. The visualization SVG 308 highlights or unhighlights a graphical element at step 720 depending upon the previous state of the graphical element. At step 722, the visualization JavaScript logic 310 communicates to the descriptions JavaScript logic 322 to describe the step previously performed. At step 724, the description is displayed on the HTML text area 324. It should be understood that the steps 716-724 perform graphical steps on the visualization GUI 120 that indicate collaborations of the underlying architecture for the software system. In other words, the graphical operations represent the functionality or dynamics of the underlying architecture of the software system.

The previous description is of at least one embodiment for implementing the principles of the present invention, and the scope of the invention should not necessarily be limited by this description. The scope of the present invention is instead defined by the following claims.

What is claimed is:

1. A method for providing a dynamic visualization of an underlying architecture of a software system within a network, said method comprising:
   accessing a datafile descriptive of the underlying architecture;
   transforming the datafile to determine architectural components used to form the underlying architecture;
   rendering, via a visualizer, a plurality of graphical elements representative of the architectural components, the graphical elements forming a graphical representation of the underlying architecture, the graphical representation dependent on a particular mode of a plurality of modes of operation of the visualizer;
   displaying, on a web page, the graphical representation of the underlying architecture of the software system;
   providing at least one control on the web page;
   receiving a selection of the at least one control;
   performing a graphical operation on the web page distinct from the rendering step for dynamic visualization of the graphical elements representative of the architectural components of the underlying architecture of the software system;
   wherein the dynamic visualization provides a graphical representation of collaborative interactions between the architectural components of the underlying architecture of the software system;
   communicating the rendered graphical representation across the network; and
   wherein the visualizer is utilized for visualizing, using the web page, the underlying architecture of the software system during conceptual, development and deployment phases of the software system; and
   wherein the architectural components of the underlying architecture are non-visual components that provide for back end operability of the software system.

2. The method according to claim 1, further comprising:
   generating a plurality of subsections of a graphical image; and
   locating the graphical elements in the subsections as described by the datafile.

3. The method according to claim 1, wherein the subsections are displayed as tiers.

4. The method according to claim 1, further comprising providing access to the visualization on a network.

5. The method according to claim 4, wherein the network is the Internet.

6. The method according to claim 1, further comprising receiving data for said rendering from a network connection.

7. The method according in claim 6, further comprising: storing the data.

8. The method according to claim 1, wherein the datafile includes extensible markup language (XML).

9. The method according to claim 1, further comprising altering the graphical elements based on a selected configuration of the software system.

10. The method according to claim 1, further comprising:
    receiving an event initiated by an operation performed in a second graphical display operating in isolation of actual components of the underlying architecture; and
    performing an operation on the graphical display based on the event.

11. The method according to claim 1, further comprising:
    receiving an event initiated by an operation performed in a second graphical display operating in conjunction with actual components of the underlying architecture; and
    performing an operation on the graphical display based on the event.

12. The method of claim 1, wherein the step of rendering comprises the step of rendering, via the visualizer, a plurality of graphical elements representative of conceptual architectural components, the visualizer rendering the graphical elements in a direct interaction simulation mode.

13. The method of claim 1, wherein the step of rendering comprises the step of rendering, via the visualizer, a plurality of graphical elements representative of conceptual and developed architectural components, the visualizer rendering the graphical elements in a prototype simulation mode.

14. The method of claim 1, wherein the step of rendering comprises the step of rendering, via the visualizer, a plurality of graphical elements representative of developed architectural components, the visualizer rendering the graphical elements in an architecture driven monitor mode.

15. A computer-readable medium having stored thereon sequences of instructions, the sequences of instructions including instructions, when executed by a processor, causes the processor to:
    access a datafile descriptive of an underlying architecture;
    transform the datafile to determine architectural components used to form the underlying architecture;
    render, via a visualizer, a plurality of graphical elements representative of the architectural components on a graphical display, the graphical elements forming a graphical representation of the underlying architecture, the graphical representation dependent on a particular mode of a plurality of modes of operation of the visualizer;
    display, on a web page, the graphical representation of the underlying architecture of a software system;
    provide at least one control on the web page;
    receive a selection of the at least one control;
    perform a graphical operation on the web page distinct from the rendering step for dynamic visualization of the graphical elements representative of the architectural components of the underlying architecture of the software system;
    wherein the dynamic visualization provides a graphical representation of collaborative interactions between the architectural components of the underlying architecture of the software system;
    wherein the instructions further cause the processor to communicate the graphical representation of the underlying architecture across a network;
    wherein the visualizer is utilized for visualizing, using the web page, the underlying architecture of the software system during conceptual, development and deployment phases of the software system; and
    wherein the architectural components of the underlying architecture are non-visual components that provide for back end operability of the software system.

16. The computer-readable medium according to claim 15, wherein the network is the Internet.

17. An application service provider (ASP) system for visualizing an underlying architecture of another distinct software system, the ASP system comprising:
    a processor;
    a datafile including a description of the underlying architecture;
    a host computing system for transforming the datafile;

a visualizer for receiving the transformed datafile and visualizing the underlying architecture, the visualizer operating in one of a plurality of modes of operation;

a visual display for receiving and displaying the visualized underlying architecture of said another distinct software system;

wherein the visualizer is utilized for visualizing the underlying architecture of the system during conceptual, development and deployment phases of the system;

wherein the visual display is a web page on the Internet;

wherein the visual display includes at least one control;

wherein the at least one control is adapted to perform a graphical operation on the web page distinct from the rendering step for dynamic visualization of architectural components of the underlying architecture of said another distinct software system;

wherein the dynamic visualization provides a graphical representation of collaborative interactions between the architectural components of the underlying architecture; and wherein the architectural components of the underlying architecture are non-visual components that provide for back end operability of said another distinct software system.

18. The ASP system according to claim 17, wherein the visualization is displayed as a graphical user interface having the at least one control for altering the visualization.

19. The ASP system according to claim 18, wherein the at least one control initiates a simulated event.

20. The ASP system according to claim 17, wherein the datafile includes extensible markup language (XML) code.

21. The ASP system according to claim 17, host computing system further:

receives an event initiated by an operation performed in a graphical user interface operating in isolation of actual components of the architecture; and performs an operation on the visual display based on the event.

22. The ASP system according to claim 17, wherein said host computing system further:

receives an event initiated by an operation performed in a graphical user interface operating in conjunction with actual components of the underlying architecture; and performs an operation on the visual display based on the event.

23. A method for providing a visualization of an underlying architecture of a software system within a network, said method comprising:

accessing a datafile descriptive of the underlying architecture;

transforming the datafile to determine architectural components used to form the underlying architecture;

rendering, via a visualizer, a plurality of graphical elements representative of the architectural components, the graphical elements forming a graphical representation of the underlying architecture;

displaying, on a web page, the graphical representation of the underlying architecture;

performing a graphical operation on the graphical representation for dynamic visualization of the graphical elements indicative representative of the architectural components of the underlying architecture of the software system;

wherein the dynamic visualization provides a graphical representation of collaborative interactions between the architectural components of the underlying architecture of the software system;

communicating the rendered graphical representation across the network; and wherein the architectural components of the underlying architecture are non-visual components that provide for back end operability of the software system.

24. A computer-readable medium having stored thereon sequences of instructions, the sequences of instructions including instructions, when executed by a processor, causes the processor to:

access a datafile descriptive of an underlying architecture;

transform the datafile to determine architectural components used to form the underlying architecture;

render, via a visualizer, a plurality of graphical elements representative of the architectural components, the graphical elements forming a graphical representation of the underlying architecture;

display, on a web page, the graphical representation of the underlying architecture;

perform a graphical operation on the graphical representation for dynamic visualization of the graphical elements representative of the architectural components of the underlying architecture of the software system;

wherein the dynamic visualization provides a graphical representation of collaborative interactions between the architectural components of the underlying architecture of the software system;

wherein the instructions further cause the processor to communicate the graphical representation of the underlying architecture across a network; and wherein the architectural components of the underlying architecture are non-visual components that provide for back end operability of the software system.

25. An application service provider (ASP) system for visualizing an underlying architecture of another distinct software system, the ASP system comprising:

a processor;

a datafile including a description of the underlying architecture;

a host computing system for transforming the datafile;

a visualizer for receiving the transformed datafile and visualizing the underlying architecture;

a visual display for receiving and displaying the visualized underlying architecture of said another distinct software system;

wherein the visualizer is adapted to perform a graphical operation on the graphical representation for dynamic visualization of architectural components indicative of the underlying architecture of said another distinct software system;

a second visual display for displaying, on a web page, the graphical representation for dynamic visualization of architectural components indicative of the underlying architecture of said another distinct software system;

wherein the dynamic visualization provides a graphical representation of collaborative interactions between the architectural components of the underlying architecture; and wherein the architectural components of the underlying architecture are non-visual components that provide for back end operability of said another distinct software system.

\* \* \* \* \*

UNITED STATES PATENT AND TRADEMARK OFFICE
CERTIFICATE OF CORRECTION

PATENT NO. : 7,415,697 B1
APPLICATION NO. : 09/971720
DATED : August 19, 2008
INVENTOR(S) : David Ian Houlding Page 1 of 1

It is certified that error appears in the above-identified patent and that said Letters Patent is hereby corrected as shown below:

COLUMN 3, LINE 13

Replace  "the" at the beginning of the sentence
With  --The--

COLUMN 5, LINE 41

Replace  "1110"
With  --110--

COLUMN 6, LINE 48

Replace  "the" before *data*
With  --The--

COLUMN 6, LINE 50

Replace  "the" before *business*
With  --The--

COLUMN 7, LINE 13

Replace  "the" before *security*
With  --The--

Signed and Sealed this

Thirtieth Day of December, 2008

JON W. DUDAS
*Director of the United States Patent and Trademark Office*